United States Patent
Hayashi

(10) Patent No.: US 11,364,730 B2
(45) Date of Patent: Jun. 21, 2022

(54) DECORATIVE SHEET MANUFACTURING METHOD FOR MANUFACTURING FROSTED GLASS-LIKE DECORATIVE SHEET

(71) Applicant: TOKYO PRINTING INK MFG. CO., LTD., Tokyo (JP)

(72) Inventor: Katsuhiko Hayashi, Saitama (JP)

(73) Assignee: TOKYO PRINTING INK MFG. CO., LTD., Tokyo (JP)

( * ) Notice: Subject to any disclaimer, the term of this patent is extended or adjusted under 35 U.S.C. 154(b) by 0 days.

(21) Appl. No.: 17/416,924

(22) PCT Filed: Aug. 22, 2019

(86) PCT No.: PCT/JP2019/032769
§ 371 (c)(1),
(2) Date: Jun. 21, 2021

(87) PCT Pub. No.: WO2020/129302
PCT Pub. Date: Jun. 25, 2020

(65) Prior Publication Data
US 2022/0040996 A1 Feb. 10, 2022

(30) Foreign Application Priority Data
Dec. 21, 2018 (JP) .............................. JP2018-239033

(51) Int. Cl.
| | | |
|---|---|---|
| B41J 11/00 | (2006.01) | |
| C09D 11/101 | (2014.01) | |
| C09D 11/38 | (2014.01) | |
| B44C 1/17 | (2006.01) | |

(52) U.S. Cl.
CPC ....... B41J 11/00214 (2021.01); C09D 11/101 (2013.01); C09D 11/38 (2013.01); B44C 1/1733 (2013.01)

(58) Field of Classification Search
CPC .. B41J 11/00214; C09D 11/101; C09D 11/38; B44C 1/1733
See application file for complete search history.

(56) References Cited

U.S. PATENT DOCUMENTS

| 7,638,163 B2 | 12/2009 | Murakami et al. |
|---|---|---|
| 2003/0148024 A1* | 8/2003 | Kodas ..................... C23C 18/08 106/1.23 |
| 2004/0091642 A1 | 5/2004 | Murakami et al. |
| 2010/0165022 A1* | 7/2010 | Makuta .................. B41J 2/0451 347/33 |
| 2013/0140806 A1* | 6/2013 | Wilkinson ................ B44C 1/20 283/109 |
| 2014/0255669 A1* | 9/2014 | Akou ...................... B32B 25/14 428/203 |
| 2016/0236447 A1* | 8/2016 | Akou ...................... B32B 25/08 |

FOREIGN PATENT DOCUMENTS

| JP | 2004-151642 A | 5/2004 |
|---|---|---|
| JP | 2004-325861 A | 11/2004 |
| JP | 2008-213152 A | 9/2008 |
| JP | 2014-8687 A | 1/2014 |
| JP | 2015-200820 A | 11/2015 |
| JP | 2018-51791 A | 4/2018 |
| JP | 2018-167501 A | 11/2018 |

OTHER PUBLICATIONS

International Search Report (ISR) dated Sep. 24, 2019 filed in PCT/JP2019/032769.

* cited by examiner

*Primary Examiner* — Jessica M Roswell
(74) *Attorney, Agent, or Firm* — Rankin, Hill & Clark LLP

(57) ABSTRACT

A decorative sheet manufacturing method of the present invention is for manufacturing a frosted glass-like decorative sheet using an inkjet printer including a head unit provided with a plurality of nozzles for jetting liquid droplets of an ultraviolet curable ink and an ultraviolet irradiation unit that moves together with the head unit in a main scanning direction of the head unit and irradiates the liquid droplets jetted from the nozzles and landed on a main surface of a transparent base material with ultraviolet rays, the frosted glass-like decorative sheet having the transparent base material and a plurality of dots formed in a print region on the main surface of the transparent base material and formed of a cured product of the ultraviolet curable ink by carrying out inkjet printing having predetermined printing conditions in a multi-pass manner.

17 Claims, 1 Drawing Sheet

DECORATIVE SHEET MANUFACTURING METHOD FOR MANUFACTURING FROSTED GLASS-LIKE DECORATIVE SHEET

TECHNICAL FIELD

The present invention relates to a decorative sheet manufacturing method for manufacturing a frosted glass-like decorative sheet.

BACKGROUND ART

Various developments have been made so far in the technique for manufacturing a frosted glass-like decorative sheet using an inkjet printer. As a technique of this kind, for example, the technique described in Patent Document 1 is known. Patent Document 1 describes that a UV curable ink made of a UV curable transparent adhesive is jetted from a nozzle of an inkjet printer onto a surface of a base material and at the same time irradiated with ultraviolet rays to cure the UV curable transparent ink in a frosted glass tone to form a sandblast-like coating film on the surface of the base material (Claim 1 of Patent Document 1).

RELATED DOCUMENT

Patent Document

[Patent Document 1] Japanese Unexamined Patent Publication No. 2008-213152

SUMMARY OF THE INVENTION

However, as a result of examination by the present inventors, it has been found that there is room for improvement in terms of banding and productivity in manufacturing a frosted glass-like decorative sheet in the manufacturing method described in Patent Document 1.

According to the present invention, there is provided a decorative sheet manufacturing method for manufacturing a frosted glass-like decorative sheet, using an inkjet printer including a head unit provided with a plurality of nozzles for jetting liquid droplets of an ultraviolet curable ink and an ultraviolet irradiation unit that moves together with the head unit in a main scanning direction of the head unit and irradiates the liquid droplets jetted from the nozzles and landed on a main surface of a transparent base material with ultraviolet rays, the frosted glass-like decorative sheet having the transparent base material and a plurality of dots formed in a print region on the main surface of the transparent base material and formed of a cured product of the ultraviolet curable ink, and the decorative sheet manufacturing method including a printing step of forming the plurality of dots on the main surface of the transparent base material by carrying out inkjet printing satisfying the following printing conditions (1) to (3) in a multi-pass manner using the inkjet printer.

(Printing Conditions)

(1) An amount of the liquid droplets jetted from the nozzles is equal to or more than 1 pl and equal to or less than 50 pl.

(2) A waiting time from when the liquid droplets jetted from the nozzles land on the main surface to when the liquid droplets are irradiated with ultraviolet rays from the ultraviolet irradiation unit is equal to or longer than 10 ms and equal to or shorter than 5.0 s.

(3) when a liquid droplet density in the print region in a case where the head unit is main-scanned once in the main scanning direction is defined as "the amount of the liquid droplets in the (1)×output resolution in main scanning direction×output resolution in sub-scanning direction/number of passes of the inkjet printer", the liquid droplet density is equal to or more than 0.1 µl/in$^2$ and equal to or less than 1.0 µl/in$^2$.

According to the present invention, there is provided a method for manufacturing a frosted glass-like decorative sheet in which the occurrence of banding is suppressed and the productivity is excellent.

BRIEF DESCRIPTION OF THE DRAWINGS

The above-mentioned objects and other objectives, features and advantages will be further clarified by the suitable embodiments which will be described later and the accompanying drawings which will be described later.

FIG. 1A is a top view schematically showing a decorative sheet. FIG. 1B is an enlarged view of an a region of FIG. 1A. FIG. 1C is a cross-sectional view taken along a line A-A of FIG. 1B.

DESCRIPTION OF EMBODIMENTS

Figure 1A:
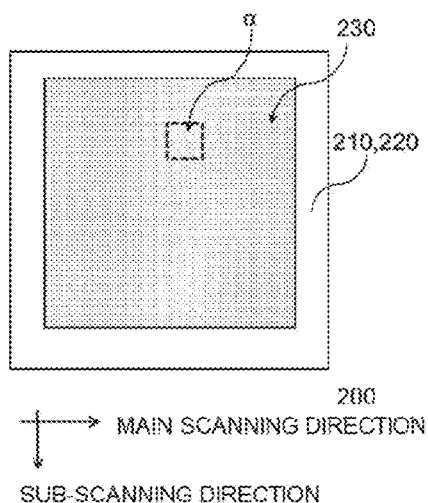
FIGS. 1A, 1B and 1C are schematic views showing an example of a configuration of a frosted glass-like decorative sheet according to the present embodiment.

Hereinafter, embodiments of the present invention will be described with reference to the drawings. In all drawings, the same or similar components are denoted by the same reference numerals, and description thereof will be omitted as appropriate. In addition, each drawing is a schematic view and a dimensional ratio in each drawing does not necessarily match an actual dimensional ratio.

In the present embodiment, the front-back, left-right, and up-down directions will be defined and described as shown in the drawing. However, this is provided for convenience in order to briefly explain the relative relationships of the components. Therefore, it does not limit the direction at the time of manufacturing and use of a product in which the present invention is implemented.

The outline of the decorative sheet manufacturing method of the present embodiment will be described.

The decorative sheet manufacturing method of the present embodiment is carried out using an inkjet printer including a head unit provided with a plurality of nozzles for jetting liquid droplets of ultraviolet curable ink and an ultraviolet irradiation unit that moves together with the head unit in a main scanning direction of the head unit and irradiates the liquid droplets jetted from the nozzles and landed on a main surface of a transparent base material with ultraviolet rays.

The decorative sheet manufacturing method uses this inkjet printer to manufacture a frosted glass-like decorative sheet having the transparent base material and a plurality of dots formed in a print region on the main surface of the transparent base material and formed of a cured product of ultraviolet curable ink.

Such a decorative sheet manufacturing method includes a printing step of forming the plurality of dots on the main surface of the transparent base material by carrying out inkjet printing satisfying the following printing conditions (1) to (3) in a multi-pass manner using the inkjet printer.

(Printing Conditions)

(1) An amount of the liquid droplets jetted from the nozzles is equal to or more than 1 μl and equal to or less than 50 μl.

(2) A waiting time from when the liquid droplets jetted from the nozzles land on the main surface to when the liquid droplets are irradiated with ultraviolet rays from the ultraviolet irradiation unit is equal to or longer than 10 ms and equal to or shorter than 5.0 s.

(3) when a liquid droplet density in the print region in a case where the head unit is main-scanned once in the main scanning direction is defined as "the amount of the liquid droplets in (1)×output resolution in main scanning direction×output resolution in sub-scanning direction/number of passes of inkjet printer", the liquid droplet density is equal to or more than 0.1 μl/in$^2$ and equal to or less than 1.0 μl/in$^2$.

According to the findings of the present inventors, in multi-pass inkjet printing, by appropriately controlling an the amount of the liquid droplets jetted from an inkjet ink nozzle, a curing timing of an inkjet ink (that is, a "waiting time" from when liquid droplets land on a main surface to when the liquid droplets are irradiated with ultraviolet rays), and a "liquid droplet density" of an inkjet ink on a main surface, it is possible to form frosted glass-like printed matter and it is possible to suppress the occurrence of band-shaped streak unevenness (banding) that regularly occurs in a main scanning direction of an inkjet printer, which in turn can improve the productivity.

In the present embodiment, the amount of the liquid droplets means an amount of ink jetted from one nozzle. In a case where the amount of the liquid droplets is less than the lower limit value of 1 pl, filling a predetermined region of a decorative sheet requires a very high output resolution head and a huge number of passes, which can be unacceptable for productivity. On the other hand, in a case where the amount of the liquid droplets is greater than the upper limit value, the resolution may be lowered and therefore the image quality may be deteriorated. Most of the commercially available inkjet heads correspond to an amount of the liquid droplets of 1 pl to 50 pl.

The shape of the dot, which is a cured product of an ink, changes depending on the "waiting time" from when liquid droplets of an inkjet ink land on a main surface to when the liquid droplets are irradiated with ultraviolet rays. That is, in a case where the "waiting time" is too short, the liquid droplets are cured in a state where the liquid surface and edges are disturbed immediately after landing of the liquid droplets, so that the obtained dot shape becomes non-uniform.

On the other hand, in a case where the "waiting time" is set to be equal to or more than the above lower limit value, the shape of landed ink can be stably obtained and variations in the dot-to-dot spacing of ink can be suppressed, which makes it possible to realize a frosted glass-like decorative sheet in which the occurrence of banding is suppressed.

In addition, in a case where the "liquid droplet density" of the ink landing on the main surface is too high, the adjacent inks may be unintentionally connected to each other. Some of the liquid droplets come into contact with each other or two or more liquid droplets are integrated, which, in turn, results in an increased contact area of the ink with respect to the main surface and a variation in dot-to-dot spacing. In a case where the inks are connected to each other, the printed matter consisting of dots transmits light excessively, that is, the haze of the printed matter is reduced.

On the other hand, in a case where the "liquid droplet density" is set to be equal to or less than the above upper limit value, dots of ink are stably formed and variations in the dot-to-dot spacing can be suppressed, which makes it possible to realize a frosted glass-like decorative sheet in which an occurrence of banding is suppressed and an aesthetic appearance is excellent.

Hereinafter, the decorative sheet manufacturing method of the present embodiment will be described in detail.

Figure 1B:
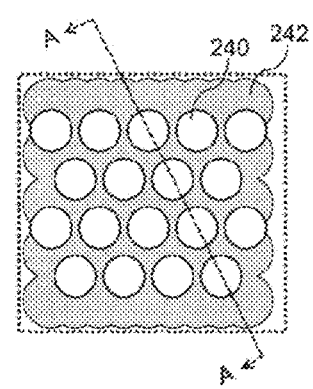
Figure 1C:
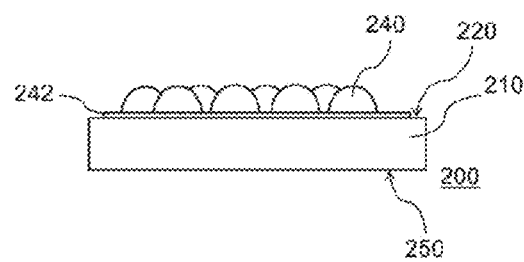

FIG. 1A is a top view schematically showing an example of a decorative sheet 200. FIG. 1B is an enlarged view of an a region of FIG. 1A, and FIG. 1C is a cross-sectional view taken along a line A-A of FIG. 1B.

The decorative sheet 200 of the present embodiment is manufactured by multi-pass inkjet printing using an inkjet printer 100 and adopting appropriate printing conditions.

The decorative sheet 200 is a frosted glass-like decorative sheet having a transparent base material 210 and a plurality of dots 240 formed in a print region 230 on a main surface 220 of the transparent base material 210. The plurality of dots 240 are formed of a cured product of an ultraviolet curable ink.

The top view shape of the print region constituted of a plurality of dots 240 in the decorative sheet 200 can be applied to various shapes according to the application by utilizing the characteristics of on-demand printing by inkjet. The top view shape of the print region may be a pattern shape such as a rectangle or a circle or a shape having a gradation, or may be a character shape such as an alphabet character or a Chinese character. Alternatively, these patterns may be removed from the print region.

The decorative sheet 200 of the present embodiment can be used to decorate the surface of a base transparent member such as glass or plastic in a frosted glass tone. The decorative sheet 200 can be applied to, for example, building members, interior members, and the like.

The decorative sheet 200 has a haze of 35% to 95%, preferably 45% to 95%, and more preferably 55% to 95%. In a case where the haze is set to be equal to or more than the above lower limit value, the frosted glass-like decorative sheet 200 having an appropriate diffusion (blurring) effect can be realized.

The decorative sheet 200 has a total light transmittance of 60% to 99%. In a case where the total light transmittance is set to be equal to or more than the above lower limit value, the frosted glass-like decorative sheet 200 having appropriate visibility can be realized.

The transparent base material 210 of the decorative sheet 200 is not particularly limited as long as it has light transmittance, but the decorative sheet 200 is made of a sheet-like light-transmitting resin film using a resin material such as polyester, polyolefin, polyurethane, polychloroprene, vinyl chloride resin, or acrylic resin. In a case where the decorative sheet 200 is made of a sheet-like resin material, the transportability of the decorative sheet 200 is improved. In addition, the decorative sheet 200 can be easily cut into any shape.

The decorative sheet 200 may include an adhesive layer provided on a back surface 250 opposite to the main surface on which a plurality of dots 240 are formed. The adhesive layer makes it possible to attach the decorative sheet 200 to the surface of the above-mentioned base transparent member.

A known adhesive can be used for the adhesive layer, and known silicone-based adhesive and known rubber-based adhesive can be used in addition to an acrylic-based adhesive. Thereby, a transparent or translucent adhesive layer can be formed.

The main surface 220 of the decorative sheet 200 on which the dots 240 are formed may be one in which the surface of the transparent base material 210 is not subjected to a treatment, but may be one in which the surface of the transparent base material 210 is subjected to a known treatment. Examples of the surface treatment include easy adhesion treatments of ink such as a corona treatment, a plasma treatment, a flame treatment, and a primer treatment.

Figure 2:
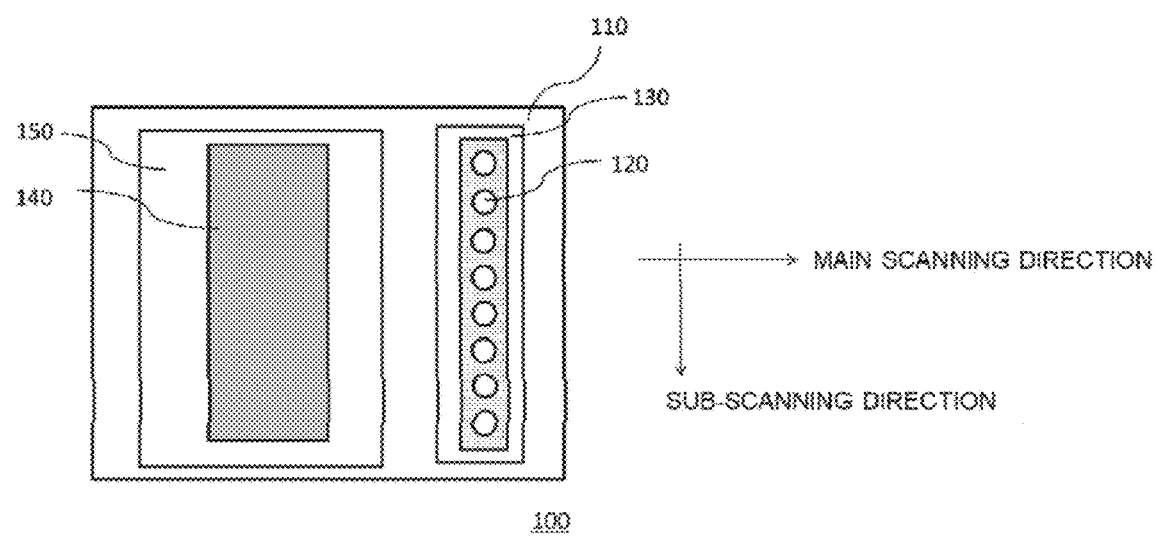
FIG. 2 is a schematic view showing an example of a configuration of an inkjet printer of the present embodiment.

Next, the details of the printing conditions of the inkjet printer 100 of the present embodiment will be described with reference to FIG. 2. FIG. 2 is a schematic view showing an example of a configuration of the inkjet printer 100.

As shown in FIG. 2, the inkjet printer 100 has a carriage 110 including a head unit 130 and an irradiation unit 150 (ultraviolet irradiation unit).

The carriage 110 can move in an outward path direction and a return path direction of the main scanning direction. In a case where the transparent base material 210 is sent in an upper direction (upper side of the paper surface in FIG. 2(a)) of the sub-scanning direction orthogonal to the main scanning direction, the carriage 110 is located in a lower direction (lower side of the paper surface in FIG. 2(a)) of the sub-scanning direction relative to the transparent base material 210.

The head unit 130 and the irradiation unit 150 are parallelly arranged in the main scanning direction in the carriage 110. The irradiation unit 150 may be arranged on at least one side of the head unit 130, but may be arranged on both sides of the head unit 130. By arranging the irradiation unit 150 in parallel on both sides of the head unit 130, printing can be carried out in either the outward path direction or the return path direction.

The head unit 130 includes a plurality of nozzles 120 for jetting liquid droplets of ultraviolet curable ink.

The plurality of nozzles 120 constitute a nozzle line in which two or more nozzles 120 are provided at predetermined intervals in the sub-scanning direction. A plurality of the head units 130 may be arranged with the expansion thereof in either the main scanning direction or the sub-scanning direction.

The irradiation unit 150 (ultraviolet irradiation unit) includes a lamp 140 that irradiates the liquid droplets jetted from the nozzle 120 and landed on the main surface 220 of the transparent base material 210 with ultraviolet rays.

The details of the printing conditions (1) to (3) in the present embodiment are as follows.

(1) The amount of liquid droplets of inkjet ink jetted from the nozzle 120 is set to be equal to or more than 1 µl and equal to or less than 50 µl. The amount of the liquid droplets can be appropriately selected according to the output resolution.

(2) The waiting time is defined as a time from when liquid droplets jetted from the nozzle 120 land on the main surface 220 to when the liquid droplets are irradiated with ultraviolet rays from the irradiation unit 150. The waiting time is set to be equal to or longer than 10 ms and equal to or shorter than 5.0 s.

The waiting time can be actually measured, but is calculated from the "distance (mm) from nozzle 120 to lamp 140/moving speed (mm/s) of carriage 110", in consideration of the time until the liquid droplets reach the main surface from the nozzle "distance (mm) between nozzle and base material/liquid droplet velocity (mm/s)".

By setting the waiting time to be equal to or more than the above lower limit value, the occurrence of banding can be suppressed. By setting the waiting time to be equal to or less than the above upper limit value, the productivity of the decorative sheet 200 can be set within an acceptable range.

(3) The liquid droplet density in the print region 230 in a case where the head unit 130 is main-scanned once in a main scanning direction is defined as "the amount of the liquid droplets in (1)×output resolution in main scanning direction×output resolution in sub-scanning direction/number of passes of inkjet printer". The liquid droplet density is set to be equal to or more than 0.1 µl/in² and equal to or less than 1.0 µl/in².

By setting the liquid droplet density to be equal to or less than the above upper limit value, the occurrence of banding can be suppressed. In addition, the decrease in haze can be suppressed. By setting the liquid droplet density to be equal to or more than the above lower limit value, the productivity of the decorative sheet 200 can be set within an acceptable range.

In addition, even in a case where the area or speed of the inkjet printer 100 is increased, a frosted glass-like effect can be similarly obtained by appropriately controlling the liquid droplet density of (3) above.

Under the above printing conditions, the number of passes in a multi-pass manner is, for example, equal to or more than 4, preferably equal to or more than 6, and more preferably equal to or more than 8. As a result, the occurrence of banding can be suppressed. On the other hand, the upper limit value of the number of passes is not particularly limited, but may be, for example, 64. As a result, the decrease in productivity can be suppressed.

In a 4-pass simple model, the output data is divided into four groups (4 divisions) and 4 main scans are carried out to complete the inkjet printing of the nozzle width in the sub-scanning direction.

Here, an example of the procedure of the inkjet printing step will be described.

First, in a first pass, liquid droplets are randomly jetted onto the main surface 220 of the transparent base material 210. In this case, by appropriately selecting the surface tension of the liquid droplets, the liquid droplets in the first pass spread wet with respect to the main surface at the time of landing, are connected to each other, and are cured in a leveled state. As a result, a leveling layer 242 is formed.

Even in a case where the number of liquid droplets is small in the first pass or even in a case where there is a portion where the liquid droplets do not sufficiently spread wet and do not form a leveling layer, liquid droplets in a second pass land on that portion and spread wet to form the leveling layer.

The subsequent liquid droplets are then randomly jetted onto the previously cured product (leveling layer 242) to be cured. That is, at least a part of the liquid droplets after the second pass is landed on the cured product (leveling layer 242) of the liquid droplets. By appropriately selecting the surface tension of the liquid droplets, the subsequent liquid droplets are repelled on the leveling layer 242 to form independent convex dots 240. By repeating this procedure, a frosted glass-like decorative sheet can be formed.

A plurality of dots 240 shown in FIG. 1C are formed on the leveling layer 242 formed on the main surface 220 of the transparent base material 210. In this manner, an excellent frosted glass-like decorative sheet 200 can be formed.

In a case where the surface tension of the main surface 220 of the transparent base material 210 is moderately low, even the liquid droplets in the first pass are repelled and are not connected to each other, resulting in the formation of independent convex dots. Therefore, in this case, the dots

240 are directly formed on the main surface 220 of the transparent base material 210.

In addition, in the above printing step, the printing conditions in each pass may be the same or may be appropriately changed as long as those printing conditions satisfy the above-mentioned (1) to (3). In addition to the printing conditions (1) to (3) above, ink conditions and other printing conditions may be changed in each pass during the above-mentioned printing step.

In addition, the decorative sheet manufacturing method of the present embodiment may have a known step in addition to the above-mentioned printing step.

In the decorative sheet manufacturing method of the present embodiment, the above-mentioned printing step may be carried out once or may be repeated twice or more. The plurality of printing steps may be continuously carried out, but known steps may be appropriately carried out before and after the printing step.

Next, the inkjet ink used in the inkjet printer will be described.

The ink used may be heated to 35° C. to 60° C. Thereby, the viscosity of the ink jetted from the nozzle 120 can be appropriately controlled.

The liquid droplet velocity of the ink jetted from the nozzle 120 is usually controlled to 5 m/s to 7 m/s.

As the ultraviolet curable ink, it is preferable to use an ink having a surface tension of equal to or less than 25 mN/m measured at 25° C. As a result, an appropriate light diffusion (blurring) effect can be obtained.

The integrated light amount of ultraviolet rays irradiated to the liquid droplets of the ultraviolet curable ink landing on the main surface 220 of the transparent base material 210 is equal to or more than 10 mJ/cm$^2$ and preferably equal to or more than 30 mJ/cm$^2$. Thereby, the ultraviolet curable ink can be sufficiently cured. The upper limit value of the integrated light amount is appropriately determined according to the moving speed of the carriage 110 and the number of passes.

The ultraviolet curable ink of the present embodiment is used for forming a frosted glass-like decorative sheet, and is an ink for multi-pass inkjet printing.

The ultraviolet curable ink includes a polymerizable monomer and a surface conditioner. This ultraviolet curable ink has a characteristic that the surface tension measured at 25° C. is equal to or less than 25 mN/m.

In a case where the surface tension is set to be equal to or less than 25 mN/m, not only the leveling layer can be formed with a smaller number of passes, but also the effect that the liquid droplets jetted after the formation of the leveling layer (after curing) are repelled on the leveling layer is exhibited.

On the other hand, in a case where the surface tension is larger than the above upper limit value, the ink liquid droplets after next landing do not have an effect of being repelled by the cured ink that is a base, and the ground contact area increases. As a result, adjacent dots are connected to each other, and a frosted glass-like decorative sheet cannot be obtained.

Hereinafter, the details of the composition components of the ultraviolet curable ink of the present embodiment will be described.

The ultraviolet curable ink includes a polymerizable monomer.

A compound having two or more ethylenically unsaturated groups in a molecule thereof can be used as the polymerizable monomer. Examples of the ethylenically unsaturated group (ethylenically double bond group) include an acryloyl group, a methacryloyl group, a vinyl group, a vinylene group, a vinylidene group, an allyl group, and a vinyl ether group.

In the present specification, the term "(meth)acrylate" represents acrylate and methacrylate, the term "(meth)acrylic" represents acrylic and methacrylic, and the term "(meth)acryloyl" represents acryloyl and methacryloyl.

The polymerizable monomer can include a polyfunctional monomer.

The polyfunctional monomer is constituted of a compound having two or three or more ethylenically unsaturated groups in a molecule thereof. From the viewpoint of easy availability, a polyfunctional (meth)acrylate can be used as the polyfunctional monomer.

Specific examples of difunctional (meth)acrylate include 1,4-butanediol diacrylate, 1,6-hexanediol diacrylate, 1,9-nonanediol diacrylate, 1,10-decanediol diacrylate, 2-butyl-2-ethyl-1,3-propanediol diacrylate, diethylene glycol diacrylate, triethylene glycol diacrylate, tetraethylene glycol diacrylate, dipropylene glycol diacrylate, tripropylene glycol diacrylate, 1,3-butylene glycol diacrylate, 3-methyl-1,5-pentanediol diacrylate, neopentyl glycol diacrylate, neopentyl glycol diacrylate hydroxypivalate, propylene oxide-modified (2) neopentyl glycol diacrylate, 2-methyl-1,8-octadiol diacrylate, 1,9-nonanediol diacrylate, 2-(2-vinyloxyethoxy)ethyl acrylate, and methacrylates thereof. These compounds may be used alone or in combination of two or more thereof.

Specific examples of trifunctional or higher functional (meth)acrylate include trimethylolpropane triacrylate, pentaerythritol triacrylate, dipentaerythritol tetraacrylate, pentaerythritol alkoxytetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritol ethoxytetraacrylate, glycerin propoxytriacrylate, ethoxylated dipentaerythritol hexaacrylate, caprolactam-modified dipentaerythritol hexaacrylate, propoxylated glycerin triacrylate, ethoxylated trimethylolpropane triacrylate, ethoxylated trimethylolpropane triacrylate, propoxylated trimethylolpropane triacrylate, and methacrylates thereof. These compounds may be used alone or in combination of two or more thereof.

Among these compounds, 1,6-hexanediol diacrylate, 3-methyl-1,5-pentanediol diacrylate, neopentyl glycol diacrylate, 2-(2-vinyloxyethoxy)ethyl acrylate, ethoxylated trimethylolpropane triacrylate, pentaerythritol alkoxytetraacrylate, and the like are preferably used.

The viscosity of the ultraviolet curable ink is measured using a cone-plate type viscometer, and the viscosity at 25° C. is usually equal to or more than 20 mP·s and equal to or less than 50 mP·s. By setting the viscosity in an appropriate range, the jetting stability of the ink from the nozzle can be improved. If necessary, the viscosity of the ink can be adjusted by heating the ink.

In a case where only a polyfunctional monomer having a large number of reactive groups is used from the viewpoint of increasing the reactivity of the ultraviolet curable ink, the viscosity of the ink may increase and therefore the jetting stability of the ink from the nozzle may decrease.

Therefore, by using a difunctional monomer having a relatively lower viscosity at 25° C. than a trifunctional or higher polyfunctional monomer, the reactivity of the ultraviolet curable ink can be maintained while keeping the viscosity thereof low. In addition, by using a difunctional monomer and a trifunctional or higher polyfunctional monomer in combination, the viscosity of the ink can be adjusted in a range of 35° C. to 60° C.

In the present specification, the term "to" means that an upper limit value and a lower limit value are included unless otherwise specified.

In addition, the ultraviolet curable ink of the present embodiment may be configured such that the polymerizable monomer does not include a monofunctional monomer.

As a result, it is possible to suppress a decrease in the reactivity of the ultraviolet curable ink, which in turn makes it possible to realize an inkjet ink having excellent quick curability.

The ultraviolet curable ink includes a surface conditioner.

The surface conditioner may be, for example, a silicone-based compound. Examples of the silicone-based compound include a silicone-based compound having a polydimethylsiloxane structure. Specific examples thereof include polyether-modified polydimethylsiloxane, polyester-modified polydimethylsiloxane, and polyaralkyl-modified polydimethylsiloxane.

Those compounds under trade names such as BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-378, BYK-UV3500, BYK-UV3510, and BYK-UV3570 (all manufactured by BYK-Chemie GmbH); TEGO-Rad2100, TEGO-Rad2200N, TEGO-Rad2250, TEGO-Rad2300, TEGO-Rad2500, TEGO-Rad2600, and TEGO-Rad2700 (all manufactured by Evonik Degussa GmbH); and GRANOL 100, GRANOL 115, GRANOL 400, GRANOL 410, GRANOL 435, GRANOL 440, GRANOL 450, B-1484, POLYFLOW ATF-2, KL-600, UCR-L72, and UCR-L93 (all manufactured by Kyoeisha Chemical Co., Ltd.) may be used. These compounds may be used alone or in combination of two or more thereof.

The surface tension of the ultraviolet curable ink at 25° C. is equal to or less than 25 mNm/m. Thereby, a frosted glass-like decorative sheet can be stably formed, as described above. The lower limit value of the surface tension is not particularly limited.

The surface tension is measured at 25° C. based on the Wilhelmy method (plate method).

In the present embodiment, the surface tension and the viscosity at 25° C. can be controlled by appropriately selecting, for example, the type and formulation amount of each component included in the ultraviolet curable ink, and the method for preparing an ultraviolet curable ink. Above all, for example, the type and content of the surface conditioner, the use of the difunctional monomer, and the combined use of the difunctional monomer and the trifunctional or higher polyfunctional monomer can be mentioned as factors for setting the surface tension and the viscosity at 25° C. in a desired numerical range.

The ultraviolet curable ink can include a photopolymerization initiator.

The photopolymerization initiator is a compound capable of generating a substance that initiates radical polymerization upon irradiation with ultraviolet rays.

Examples of the photopolymerization initiator include benzophenone, Michler's ketone, 4,4'-bis(diethylamino) benzophenone, xanthone, thioxanthone, isopropylxanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexylphenylketone, 2-hydroxy-1-{4-[4-(2-hydroxy-2-methyl-propionyl)-benzyl]phenyl}-2-methyl-propan-1-one, 2-hydroxy-1-{1-[4-(2-hydroxy-2-methyl-propionyl)-phenyl]-1,3,3-trimethyl-indan-5-yl}-2-methyl-propan-1-one, isopropylbenzoin ether, isobutylbenzoin ether, 2,2-diethoxyacetophenone, 2,2-dimethoxy-2-phenylacetophenone, camphorquinone, benzanthrone, 2-methyl-1-[4-(methylthio) phenyl]-2-morpholinopropan-1-one, ethyl 2-benzyl-2-dimethylamino-1-(4-morpholinophenyl)-butanone-1,4-dimethylaminobenzoate, isoamyl 4-dimethylaminobenzoate, 4,4'-di(t-butylperoxycarbonyl)benzophenone, 3,4,4'-tri(t-butylperoxycarbonyl)benzophenone, 3,3',4,4'-tetra(t-butylperoxycarbonyl)benzophenone, 3,3',4,4'-tetra(t-hexylperoxycarbonyl)benzophenone, 3,3'-di(methoxycarbonyl)-4,4'-di(t-butylperoxycarbonyl)benzophen one, 3,4'-di (methoxycarbonyl)-4,3'-di(t-butylperoxycarbonyl) benzophen one, 4,4'-di(methoxycarbonyl)-3,3'-di(t-butylperoxycarbonyl)benzophen one, 1,2-octanedione, 1-[4-(phenylthio)phenyl]-,2-(o-benzoyloxime), 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-tri azine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzthiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphen yl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinopropionyl)-9-n-dodecylcarbazole, phenylbis(2,4,6-trimethylbenzoyl)phosphine oxide, and diphenyl(2,4,6-trimethylbenzoyl)phosphine oxide. These compounds may be used alone or in combination of two or more thereof.

Above all, for example, a photopolymerization initiator having a 2-hydroxy-2-methylpropionylphenyl skeleton such as IRGACURE 127 or ESACURE ONE is preferably used because it can suppress the coloring of an ink cured product.

In a case where the ultraviolet curable ink includes titanium dioxide having an ultraviolet scattering effect, the photopolymerization initiator can include a photopolymerization initiator having a 2-hydroxy-2-methylpropionylphenyl skeleton and a photopolymerization initiator having an extinction coefficient of equal to or more than 200 ml/g·cm at a wavelength of 365 nm. By using a photopolymerization initiator having an extinction coefficient of equal to or more than 200 ml/g·cm in combination, it is possible to suppress a decrease in curability due to a photoradical reaction. For example, OMNIRAD TPO, which has photobleaching properties (which is resistant to color by ultraviolet rays) and has little odor, is preferably used. The above-mentioned extinction coefficient is a value measured by a spectrophotometer after being diluted with metal (or acetonitrile).

The amount of the photopolymerization initiator added is 1% by weight to 20% by weight and preferably 5% by weight to 20% by weight with respect to the entire ultraviolet curable ink.

The ultraviolet curable ink can include titanium dioxide that functions as an ultraviolet absorber. As a result, in a case where the ultraviolet curable ink is manufactured and then stored or transported or in a case where the ultraviolet curable ink is filled in a tank or nozzle of a printing device, the progress of the curing reaction of the ultraviolet curable ink can be suppressed even in a case of being exposed to weak ultraviolet rays irradiated from the ambient environment such as a fluorescent lamp. This makes it possible to realize an ultraviolet curable ink having excellent storability and use stability.

The upper limit value of the titanium dioxide content is equal to or less than 10% by weight and preferably equal to or less than 5% by weight with respect to 100% by weight of the ultraviolet curable ink. At this concentration, by appropriately selecting the particle size of titanium dioxide, the ink does not develop an opaque white color, and thickening and yellowing of the ink can be suppressed. In addition, at the above-mentioned concentration, the amount of the photopolymerization initiator and the polymerizable monomer is not reduced more than necessary, and therefore the ultraviolet curability can be maintained.

In the technical field of ink, titanium dioxide is also used as a white pigment, but it is known that the content of titanium dioxide in a case of being used as the white pigment is about 10% to 20% by weight with respect to the entire ink.

On the other hand, in the present embodiment, titanium dioxide is used as an ultraviolet absorber instead of a white pigment.

The average particle size (value measured by a transmission electron microscope) of titanium dioxide is equal to or more than 5 nm and equal to or less than 200 nm and preferably equal to or more than 5 nm and equal to or less than 100 nm. This makes it possible to impart a scattering effect as well as an ultraviolet absorbing effect to the ultraviolet curable ink.

The titanium dioxide can be used as a dispersion liquid of titanium dioxide previously dispersed in an ink component, in which the dispersion liquid can include a dispersant in addition to titanium dioxide and the ink component.

Examples of the dispersant include activators such as higher fatty acid salts, alkyl sulfates, alkyl ester sulfates, alkyl sulfonates, sulfosuccinates, naphthalene sulfonates, alkyl phosphates, polyoxyalkylene alkyl ether phosphates, phosphate ester salts, polyoxyalkylene alkylphenyl ethers, glycerin esters, sorbitan esters, and polyoxyethylene fatty acid amides; and polymer dispersants modified with styrene, styrene derivatives, vinylnaphthalene derivatives, acrylic acid, acrylic acid derivatives, maleic acid, maleic acid derivatives, itaconic acid, itaconic acid derivatives, fumaric acid, fumaric acid derivatives, and the like. In addition, these compounds may be used alone or in combination of two or more thereof.

For example, various dispersers such as a ball mill, a bead mill, a sand mill, an attritor, a roll mill, an agitator, a Henschel mixer, a colloid mill, an ultrasonic homogenizer, a pearl mill, a wet jet mill, and a paint shaker can be used as the above-mentioned dispersion method.

In addition, a centrifuge or a filter may be used for the purpose of removing the coarse-grained fraction of the titanium dioxide dispersion liquid.

The ultraviolet curable ink can include an antioxidant or a polymerization inhibitor.

Examples of the antioxidant or polymerization inhibitor include a hindered phenol-based antioxidant, a hindered amine-based light stabilizer, a benzophenone-based ultraviolet absorber, a benzotriazole-based ultraviolet absorber, a hindered amine-based light stabilizer, and a triazine-based ultraviolet absorber. These compounds may be used alone or in combination of two or more thereof.

Among these, an antioxidant such as a hindered phenol-based antioxidant is preferably used. As a result, yellowing of the ink can be suppressed.

The ultraviolet curable ink may be a non-water-based ultraviolet curable ink configured so as not to include water. This makes it possible to suppress a decrease in reactivity and storability of ink.

The ultraviolet curable ink may be a non-organic solvent-based ultraviolet curable ink configured so as not to include a non-reactive organic solvent. This makes it possible to suppress a decrease in reactivity of ink. Examples of the non-reactive organic solvent include ketones and alcohols.

In the present embodiment, the expression "not included" means that it is substantially not included, and a trace amount that does not impair the object of the present invention is allowed.

The ultraviolet curable ink of the present embodiment may include components other than those described above. Examples of other components include a photosensitizer, a non-reactive resin, an inorganic filler, an organic filler, a coupling agent, a tackifier, a defoamer, a pigment, a pigment derivative, and a dye.

As to the method for producing the ultraviolet curable ink of the present embodiment, the ultraviolet curable ink is obtained by mixing the above-mentioned individual components. After that, if necessary, a filtration process may be carried out using a filter or the like.

Although the embodiments of the present invention have been described hereinbefore, those embodiments are merely examples of the present invention and various configurations other than the foregoing embodiments can be adopted. In addition, the present invention is not limited to the foregoing embodiments, and modifications, improvements, and the like to the extent that the object of the present invention can be achieved are also encompassed by the present invention.

Hereinafter, examples of reference embodiments will be given.

1. A decorative sheet manufacturing method for manufacturing a frosted glass-like decorative sheet, using an inkjet printer including a head unit provided with a plurality of nozzles for jetting liquid droplets of an ultraviolet curable ink and an ultraviolet irradiation unit that moves together with the head unit in a main scanning direction of the head unit and irradiates the liquid droplets jetted from the nozzles and landed on a main surface of a transparent base material with ultraviolet rays, the frosted glass-like decorative sheet having the transparent base material and a plurality of dots formed in a print region on the main surface of the transparent base material and formed of a cured product of the ultraviolet curable ink, and the decorative sheet manufacturing method including a printing step of forming the plurality of dots on the main surface of the transparent base material by carrying out inkjet printing satisfying the following printing conditions (1) to (3) in a multi-pass manner using the inkjet printer.

(Printing Conditions)

(1) An amount of the liquid droplets jetted from the nozzles is equal to or more than 1 pl and equal to or less than 50 pl.

(2) A waiting time from when the liquid droplets jetted from the nozzles land on the main surface to when the liquid droplets are irradiated with ultraviolet rays from the ultraviolet irradiation unit is equal to or longer than 10 ms and equal to or shorter than 5.0 s.

(3) when a liquid droplet density in the print region in a case where the head unit is main-scanned once in the main scanning direction is defined as "the amount of the liquid droplets in the (1)×output resolution in main scanning direction×output resolution in sub-scanning direction/number of passes of the inkjet printer", the liquid droplet density is equal to or more than 0.1 µl/in$^2$ and equal to or less than 1.0 µl/in$^2$.

2. The decorative sheet manufacturing method according to 1, in which the number of passes is equal to or more than 4 in the printing step.

3. The decorative sheet manufacturing method according to 1 or 2, in which the ultraviolet curable ink has a surface tension of equal to or less than 25 mN/m measured at 25° C.

4. The decorative sheet manufacturing method according to any one of 1 to 3, in which an integrated light amount of ultraviolet rays emitted to the landed liquid droplets, in the printing step, is equal to or more than 10 mJ/cm$^2$.

5. The decorative sheet manufacturing method according to any one of 1 to 4, in which the transparent base material is made of a light-transmitting resin film.

6. The decorative sheet manufacturing method according to any one of 1 to 5, in which at least a part of liquid droplets after a second pass is landed on a cured product of the liquid droplets in the printing step.

7. An ultraviolet curable ink for multi-pass inkjet printing, which is used for forming a frosted glass-like decorative sheet, the ultraviolet curable ink including a polymerizable monomer and a surface conditioner, in which the ultraviolet curable ink has a surface tension of equal to or less than 25 mN/m measured at 25° C.

8. The ultraviolet curable ink according to 7, including titanium dioxide as an ultraviolet absorber, in which a content of the titanium dioxide is equal to or less than 10% by weight with respect to 100% by weight of the ultraviolet curable ink.

9. The ultraviolet curable ink according to 8, in which the titanium dioxide has an average particle size of equal to or more than 5 nm and equal to or less than 200 nm.

10. The ultraviolet curable ink according to any one of 7 to 9, in which the ultraviolet curable ink has a viscosity at 25° C. of equal to or more than 20 mP·s and equal to or less than 50 mP·s, which is measured using a cone-plate type viscosity meter.

11. The ultraviolet curable ink according to any one of 7 to 10, including a photopolymerization initiator.

12. The ultraviolet curable ink according to 11, in which the photopolymerization initiator includes a photopolymerization initiator having a 2-hydroxy-2-methylpropionylphenyl skeleton.

13. The ultraviolet curable ink according to any one of 7 to 12, in which the polymerizable monomer includes a polyfunctional monomer.

14. The ultraviolet curable ink according to any one of 7 to 13, in which the polymerizable monomer does not include a monofunctional monomer.

15. The ultraviolet curable ink according to any one of 7 to 14, including an antioxidant.

16. The ultraviolet curable ink according to any one of 7 to 15, in which the ultraviolet curable ink is a non-water-based ultraviolet curable ink that does not include water.

17. The ultraviolet curable ink according to any one of 7 to 16, in which the ultraviolet curable ink is a non-organic solvent-based ultraviolet curable ink that does not include a non-reactive organic solvent.

18. A frosted glass-like decorative sheet including a transparent base material and a plurality of dots formed in a print region on a main surface of the transparent base material, in which the dots are formed of a cured product of the ultraviolet curable ink according to any one of 7 to 17.

19. The decorative sheet according to 18, including an adhesive layer provided on a back surface opposite to the main surface on which the plurality of dots are formed.

EXAMPLES

Hereinafter, the present invention will be described in detail with reference to Examples, but the present invention is not limited thereto.

[Preparation of Inkjet Ink]

An inkjet ink (ultraviolet curable ink) was obtained by mixing and stirring raw materials in a homomixer for 60 minutes in a dry air atmosphere under shading according to formulation ratios of raw materials shown in Table 1, and then pressure-filtering the mixture through a filter having a pore size of 2 µm.

(Polymerizable Monomer)

Difunctional monomer 1: neopentyl glycol diacrylate (LIGHT ACRYLATE NP-A, manufactured by Kyoeisha Chemical Co., Ltd.)

Difunctional monomer 2: 1,6-hexanediol diacrylate (LIGHT ACRYLATE 1.6HX-A, manufactured by Kyoeisha Chemical Co., Ltd.)

Difunctional monomer 3: 2-(2-vinyloxyethoxy)ethyl acrylate (VEEA-AI, manufactured by Nippon Shokubai Co., Ltd.)

Trifunctional monomer 1: ethoxylated (9)trimethylolpropane triacrylate (SR502, manufactured by Sartomer Company Inc.)

Tetrafunctional Monomer 1: pentaerythritol alkoxytetraacrylate (EBECRYL40, manufactured by Daicel-Allnex Ltd.)

(Photopolymerization Initiator)

Photopolymerization initiator 1: 1-hydroxycyclohexylphenylketone (IRGACURE 184, manufactured by IGM Resins B.V.)

Photopolymerization Initiator 2: 2-hydroxy-1-{4-[4-(2-hydroxy-2-methyl-propionyl)-benzyl]phenyl}-2-methyl-propan-1-one (IRGACURE 127, manufactured by IGM Resins B.V.)

Photopolymerization initiator 3: 2-hydroxy-1-{1-[4-(2-hydroxy-2-methyl-propionyl)-phenyl]-1,3,3-trimethyl-indan-5-yl}-2-methyl-propan-1-one (ESACURE ONE, manufactured by Lamberti S.p.A.)

Photopolymerization Initiator 4: diphenyl(2,4,6-trimethylbenzoyl)phosphine oxide (OMNIRAD TPO, manufactured by IGM Resins B.V.)

(Additives Such as Antioxidant and Polymerization Inhibitor)

Additive 1: pentaerythritol tetrakis[3-(3,5-di-t-butyl-4-hydroxyphenyl)propionate] (hindered phenol-based antioxidant: IRGANOX 1010, manufactured by BASF SE)

(Surface Conditioner)

Surface conditioner 1: polyether-modified polydimethylsiloxane (BYK-UV3510, manufactured by BYK-Chemie GmbH)

Surface conditioner 2: polyether-modified polydimethylsiloxane (BYK-307, manufactured by BYK-Chemie GmbH)

Surface conditioner 3: polyether-modified polydimethylsiloxane (BYK-378, manufactured by BYK-Chemie GmbH)

Surface conditioner 4: polyether-modified siloxane (BYK-349, manufactured by BYK-Chemie GmbH)

(Titanium Dioxide)

Titanium Dioxide Dispersion Liquid 1

30 parts by weight of fine titanium dioxide (STR-100A, rutile type, average particle size: 16 nm, manufactured by Sakai Chemical Industry Co., Ltd.), 5 parts by weight of a dispersant (DISPERBYK-145, phosphate ester salt of high molecular weight copolymer having a pigment affinity group), and 65 parts by weight of a monomer (LIGHT ACRYLATE 1.6HX-A, manufactured by Kyoeisha Chemical Co., Ltd.) were kneaded and dispersed together with zirconia beads (bead diameter: 0.3 mm) for 10 hours using a paint shaker to obtain a titanium dioxide dispersion liquid 1 (solid content concentration of titanium dioxide: 30% by weight).

TABLE 1

| | | Unit | Experimental Example 1 | Experimental Example 2 | Experimental Example 3 | Experimental Example 4 | Experimental Example 5 | Experimental Example 6 | Experimental Example 7 | Experimental Example 8 | Experimental Example 9 | Experimental Example 10 |
|---|---|---|---|---|---|---|---|---|---|---|---|---|
| Inkjet ink | Photopolymerizable monomer | Difunctional monomer 1 | % by weight | 52 | 50 | | | | | | | | |
| | | Difunctional monomer 2 | | | | | | 50 | 50 | 50 | 50 | 50 | 50 |
| | | Difunctional monomer 3 | | | | 40 | | | | | | | |
| | | Trifunctional monomer 1 | | 35.85 | 39.8 | 49.8 | | 39.8 | 38.9 | 28.9 | 39.85 | 39.75 | 38.95 |
| | | Tetrafunctional monomer 1 | | | | | 39.8 | | | | | | |
| | Photopolymerization initiator | Photopolymerization initiator 1 | | 4 | | | | | | | | | |
| | | Photopolymerization initiator 2 | | | 2 | 2 | 2 | 2 | 2 | 2 | 2 | 2 | 2 |
| | | Photopolymerization initiator 3 | | 8 | 8 | 8 | 8 | 8 | 8 | 8 | 8 | 8 | 8 |
| | | Photopolymerization initiator 4 | | | | | | | | | | | |
| | Additive | Additive 1 | | 0.05 | 0.1 | 0.1 | 0.1 | 0.1 | 0.1 | 0.1 | 0.05 | 0.05 | 0.05 |
| | Surface conditioner | Surface conditioner 1 | | 0.1 | 0.1 | 0.1 | 0.1 | 0.1 | 1.0 | 10.0 | | | 0.1 |
| | | Surface conditioner 2 | | | | | | | | | 0.1 | | |
| | | Surface conditioner 3 | | | | | | | | | | | |
| | | Surface conditioner 4 | | | | | | | | | | | |
| | Titanium dioxide | Titanium dioxide dispersion liquid 1 | | | | | | | | | | 0.1 | |
| | Sum | | | 100 | 100 | 100 | 100 | 100 | 100 | 100 | 100 | 100 | 100 |
| | Surface tension | | mN/m | 22.7 | 23.7 | 21.6 | 22.7 | 22.6 | 21.7 | 21.5 | 24.5 | 24.0 | 22.3 |
| | Viscosity at 25° C. | | mPa·s | 24.6 | 23.8 | 23.3 | 27.9 | 27.5 | 28.3 | 34.0 | 27.6 | 28.7 | 28.8 |
| | Ink stability | Thickening | | A | A | A | A | A | A | A | A | A | A |
| | | Yellowing | | A | A | B | A | A | A | A | A | A | A |
| | Ink curability | | | A | A | A | A | A | A | A | A | A | A |

TABLE 1-continued

| | Unit | Experimental Example 11 | Experimental Example 12 | Experimental Example 13 | Experimental Example 14 | Experimental Example 15 | Experimental Example 16 | Experimental Example 17 | Experimental Example 18 | Experimental Example 19 |
|---|---|---|---|---|---|---|---|---|---|---|
| Difunctional monomer 1 | % by weight | 50 | 49 | 50 | 50 | 50 | 50 | 50 | 50 | 45 |
| Difunctional monomer 2 | | | | | | | | | | |
| Difunctional monomer 3 | | 29.95 | 39.8 | 39 | 40 | 39.9 | 39.95 | 39.94 | 29.95 | 29.8 |
| Trifunctional monomer 1 | | | | | | | | | | |
| Tetrafunctional monomer 1 | | | | | | | | | | |
| Photopolymerization initiator 1 | | | | 10 | 8 | | | | | |
| Photopolymerization initiator 2 | | 2 | | | | 2 | 2 | 2 | 2 | |
| Photopolymerization initiator 3 | | 8 | 8 | | | 8 | 8 | 8 | 8 | 8 |
| Photopolymerization initiator 4 | | | 2 | | 2 | | | | | 2 |
| Additive 1 | | 0.05 | 0.1 | 1.0 | | | 0.05 | 0.05 | 0.05 | 0.1 |
| Surface conditioner 1 | | | 0.1 | | | | | | | 0.1 |
| Surface conditioner 2 | | 10.0 | | | | | | | | |
| Surface conditioner 3 | | | | | | | | 0.01 | | |
| Surface conditioner 4 | | | | | | 0.1 | | | | |
| Titanium dioxide dispersion liquid 1 | | | 1.0 | | | | | | 10.0 | 15.0 |
| Sum | | 100 | 100 | 100 | 100 | 100 | 100 | 100 | 100 | 100 |
| Surface tension | mN/m | 21.8 | 23.0 | 36.1 | 36.0 | 36.1 | 36.1 | 29.8 | 27.5 | 22.8 |
| Viscosity at 25° C. | mPa · s | 37.6 | 28.4 | 27.6 | 27.0 | 27.6 | 27.5 | 27.5 | 25.7 | 25.1 |
| Thickening | | A | A | A | C | A | A | A | A | A |
| Yellowing | | A | A | A | C | A | A | A | A | A |
| Ink curability | | A | A | C | A | A | A | A | A | A |

The obtained inkjet ink of each of Experimental Examples was evaluated based on the following evaluation items. The results are shown in Table 1.

(Surface Tension)

The surface tension (mN/m) of the obtained inkjet ink at 25° C. was measured using a surface tensiometer (Model: CBVP-Z, manufactured by Kyowa Interface Science Co., Ltd.).

(Viscosity)

The viscosity (mPa·s) of the obtained inkjet ink at 25° C. was measured using a cone-plate type viscometer (TV-22, manufactured by Toki Sangyo Co., Ltd.) under the conditions of a shear rate of 192 $s^{-1}$ and a rotation speed of 50 rpm.

<Stability>

After exposing the obtained inkjet ink to ultraviolet rays at an amount of 5 µW/cm² for 24 hours, the presence or absence of viscosity change (thickening) and coloring (yellowing) of the ink was observed.

Using the above (viscosity) measurement method, the case where the rate of change in viscosity before and after irradiation with ultraviolet rays was within 10% was marked with A, and the case where the rate of change in viscosity exceeded 10% was marked with C.

Regarding the ink after irradiation with ultraviolet rays, the case without visual observation of yellowing was marked with A, the case with visual observation of slight yellowing was marked with B, and the case with visual observation of yellowing was marked with C.

<Curability>

The obtained inkjet ink was appropriately heated using an inkjet printer (PatterningJET, manufactured by Tritek Co., Ltd.) and an inkjet head (KM512MH, manufactured by Konica Minolta, Inc.) and jetted onto a PET film subjected to an easy adhesion treatment (COSMOSHINE A4300, manufactured by Toyobo Co., Ltd.) at an output resolution of 720×720 dpi and a printing rate of 100% (solid printing). This was followed by curing under the condition of an integrated light amount of 1000 mJ/cm² using an ultraviolet irradiation device (high-pressure mercury lamp 120 W/cm, manufactured by Eye Graphics Co., Ltd.), thereby producing a cured product.

The surface of the obtained cured film was observed by touch with a finger, and the curability was evaluated by the case having no stickiness (tack) as being marked with A and the case having stickiness as being marked with C.

Based on the results in Table 1, it was found that the inkjet inks of Experimental Examples 1 to 12 and 15 to 19 were superior in ink stability and curability as compared with those of Experimental Examples 13 and 14. The inks of Experimental Examples 13 and 14 could not be used as inks as evaluated.

Next, using the ink of each of the Experimental Examples, a frosted glass-like decorative sheet was produced as described later.

[Production of Decorative Sheet]

First, an inkjet printer with an ultraviolet irradiation device (CoolArc Cool CA300, high-pressure mercury lamp 200 W/cm, irradiation width in sub-scanning direction: 300 mm, irradiation width in main scanning direction: 90 mm, manufactured by Baldwin Technology Company Inc.) installed in a main scanning direction was prepared.

The inkjet ink of each of Experimental Examples 1 to 12 and 19 in Table 1 was jetted onto a transparent base material A or B in Table 2 according to the multi-pass printing conditions (drive frequency, carriage speed, liquid droplet amount, output resolution, waiting time until irradiation, and number of passes) in Table 2, irradiated with ultraviolet rays, and cured to obtain a decorative sheet in which a plurality of dots were formed on the main surface of the transparent base material.

Similarly, the inkjet ink of each of Experimental Examples 1 and 15 to 18 in Table 1 was printed according to the conditions in Table 3 to obtain a decorative sheet.

In the multi-pass inkjet printing, liquid droplets were randomly jetted onto the main surface of the transparent base material under the conditions that the appropriate number of liquids in each pass was the same and the printing rate was 100% (solid printing).

(Transparent Base Material)

Transparent base material A: PET film (COSMOSHINE A4300, both surfaces subjected to easy adhesion treatment, surface tension: equal to or more than 44 mN/m, manufactured by Toyobo Co., Ltd.)

Transparent base material B: PET film (product name: GUV-5105, film with adhesive layer on back surface, surface tension: equal to or less than 32 mN/m, manufactured by Lintec Corporation)

TABLE 2

|  | Unit | Example 1 | Example 2 | Example 3 | Example 4 | Example 5 | Example 6 | Example 7 |
|---|---|---|---|---|---|---|---|---|
| Driving frequency | Hz | 12330 | 3630 | 1760 | 6670 | 6670 | 900 | 900 |
| Carriage Speed | mm/s | 435 | 128 | 62 | 471 | 471 | 64 | 64 |
| The amount of the liquid droplets | pl | 14 | 14 | 14 | 42 | 42 | 42 | 42 |
| Output resolution (main scanning direction) | dpi | 720 | 720 | 720 | 360 | 360 | 360 | 360 |
| Output resolution (sub-scanning direction) | dpi | 720 | 720 | 720 | 360 | 360 | 360 | 360 |
| Waiting time until irradiation | s | 0.60 | 2.03 | 4.19 | 0.55 | 0.55 | 4.09 | 4.09 |
| Number of passes |  | 8 | 8 | 8 | 16 | 8 | 8 | 8 |
| Liquid droplet density by one main scan | µl/in² | 0.907 | 0.907 | 0.907 | 0.340 | 0.680 | 0.680 | 0.680 |
| Inkjet ink |  | Experimental Example 1 | Experimental Example 1 | Experimental Example 1 | Experimental Example 1 | Experimental Example 1 | Experimental Example 1 | Experimental Example 1 |
| Transparent base material |  | A | A | A | A | B | A | B |

TABLE 2-continued

| | | | | | | | | |
|---|---|---|---|---|---|---|---|---|
| Total light transmittance | % | 90 | 89 | 89 | 90 | 89 | 89 | 89 |
| Haze | % | 63 | 66 | 67 | 52 | 67 | 57 | 66 |
| Banding | | A | A | A | A | A | A | A |

| | Unit | Example 8 | Example 9 | Example 10 | Example 11 | Example 12 | Example 13 | Example 14 |
|---|---|---|---|---|---|---|---|---|
| Driving frequency | Hz | 14870 | 45000 | 12330 | 12330 | 12330 | 8810 | 8810 |
| Carriage Speed | mm/s | 525 | 1588 | 435 | 435 | 435 | 311 | 311 |
| The amount of the liquid droplets | pl | 6 | 13 | 14 | 14 | 14 | 14 | 14 |
| Output resolution (main scanning direction) | dpi | 1440 | 720 | 720 | 720 | 720 | 720 | 720 |
| Output resolution (sub-scanning direction) | dpi | 1440 | 720 | 720 | 720 | 720 | 720 | 720 |
| Waiting time until irradiation | s | 0.50 | 0.013 | 0.60 | 0.60 | 0.60 | 0.84 | 0.84 |
| Number of passes | | 16 | 8 | 8 | 8 | 8 | 8 | 8 |
| Liquid droplet density by one main scan | µl/in$^2$ | 0.778 | 0.842 | 0.907 | 0.907 | 0.907 | 0.907 | 0.907 |
| Inkjet ink | | Experimental Example 1 | Experimental Example 1 | Experimental Example 2 | Experimental Example 3 | Experimental Example 4 | Experimental Example 5 | Experimental Example 6 |
| Transparent base material | | A | B | A | A | A | A | A |
| Total light transmittance | % | 89 | 89 | 89 | 89 | 89 | 89 | 90 |
| Haze | % | 57 | 63 | 58 | 65 | 65 | 62 | 49 |
| Banding | | A | A | A | A | A | A | A |

| | Unit | Example 15 | Example 16 | Example 17 | Example 18 | Example 19 | Example 20 | Example 21 |
|---|---|---|---|---|---|---|---|---|
| Driving frequency | Hz | 8810 | 8810 | 8810 | 8810 | 8810 | 8810 | 8810 |
| Carriage Speed | mm/s | 311 | 311 | 311 | 311 | 311 | 311 | 311 |
| The amount of the liquid droplets | pl | 14 | 14 | 14 | 14 | 14 | 14 | 14 |
| Output resolution (main scanning direction) | dpi | 720 | 720 | 720 | 720 | 720 | 720 | 720 |
| Output resolution (sub-scanning direction) | dpi | 720 | 720 | 720 | 720 | 720 | 720 | 720 |
| Waiting time until irradiation | s | 0.84 | 0.84 | 0.84 | 0.84 | 0.84 | 0.84 | 0.84 |
| Number of passes | | 8 | 8 | 8 | 8 | 8 | 8 | 8 |
| Liquid droplet density by one main scan | µl/in$^2$ | 0.907 | 0.907 | 0.907 | 0.907 | 0.907 | 0.907 | 0.907 |
| Inkjet ink | | Experimental Example 7 | Experimental Example 8 | Experimental Example 9 | Experimental Example 10 | Experimental Example 11 | Experimental Example 12 | Experimental Example 19 |
| Transparent base material | | A | A | A | A | A | A | A |
| Total light transmittance | % | 90 | 89 | 89 | 89 | 90 | 89 | 88 |
| Haze | % | 35 | 61 | 62 | 59 | 46 | 71 | 67 |
| Banding | | A | A | A | A | A | A | A |

TABLE 3

| | Unit | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Driving frequency | Hz | 2740 | 1760 | 6670 | 6670 | 6670 | 6670 | 900 | 900 |
| Carriage speed | mm/s | 87 | 62 | 471 | 471 | 471 | 471 | 64 | 64 |
| The amount of the liquid droplets | pl | 14 | 14 | 42 | 42 | 42 | 42 | 42 | 42 |
| Output resolution (main scanning direction) | dpi | 720 | 720 | 360 | 360 | 360 | 360 | 360 | 360 |
| Output resolution (sub-scanning direction) | dpi | 720 | 720 | 360 | 360 | 360 | 360 | 360 | 360 |

TABLE 3-continued

|  | Unit | | | | | | | |
|---|---|---|---|---|---|---|---|---|
| Waiting time until irradiation | s | 2.98 | 4.19 | 0.55 | 0.55 | 0.55 | 0.55 | 4.09 | 4.09 |
| Number of passes | | 4 | 2 | 4 | 4 | 2 | 2 | 4 | 4 |
| Liquid droplet density by one main scan | μl/in² | 1.814 | 3.629 | 1.361 | 1.361 | 2.722 | 2.722 | 1.361 | 1.361 |
| Inkjet ink | | Experimental Example 1 | Experimental Example 1 | Experimental Example 1 | Experimental Example 1 | Experimental Example 1 | Experimental Example 1 | Experimental Example 1 | Experimental Example 1 |
| Transparent base material | | A | A | A | B | A | B | A | B |
| Total light transmittance | % | 89 | 90 | 89 | 89 | 90 | 90 | 89 | 89 |
| Haze | % | 67 | 32 | 47 | 66 | 34 | 51 | 51 | 64 |
| Banding | | C | C | C | C | C | C | C | C |

|  | Unit | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|
| Driving frequency | Hz | 900 | 9460 | 30000 | 8810 | 8810 | 8810 | 8810 |
| Carriage speed | mm/s | 64 | 334 | 2540 | 311 | 311 | 311 | 311 |
| The amount of the liquid droplets | pl | 42 | 6 | 14 | 14 | 14 | 14 | 14 |
| Output resolution (main scanning direction) | dpi | 360 | 1440 | 600 | 720 | 720 | 720 | 720 |
| Output resolution (sub-scanning direction) | dpi | 360 | 1440 | 600 | 720 | 720 | 720 | 720 |
| Waiting time until irradiation | s | 4.09 | 0.78 | 0.008 | 0.84 | 0.84 | 0.84 | 0.84 |
| Number of passes | | | | | | | | |
| Liquid droplet density by one main scan | μl/in² | 2.722 | 1.555 | 0.630 | 0.907 | 0.907 | 0.907 | 0.907 |
| Inkjet ink | | Experimental Example 1 | Experimental Example 1 | Experimental Example 1 | Experimental Example 15 | Experimental Example 16 | Experimental Example 17 | Experimental Example 18 |
| Transparent base material | | B | A | A | A | A | A | A |
| Total light transmittance | % | 89 | 90 | 90 | 90 | 90 | 90 | 90 |
| Haze | % | 60 | 38 | 56 | 9 | 6 | 17 | 32 |
| Banding | | | | | | | | |

The "Waiting time until irradiation" in Tables 2 and 3 was defined as a time from when liquid droplets jetted from the nozzles in the inkjet head landed on the surface of the transparent base material to when the liquid droplets were irradiated with ultraviolet rays from the lamp. The "Liquid droplet density by one main scan" was calculated from ["the amount of the liquid droplets"ד"output resolution in main scanning direction"ד"output resolution in sub-scanning direction"/"number of passes of inkjet printer" in each of Examples/Comparative Examples].

The obtained decorative sheet was evaluated based on the following evaluation items, and the results are shown in Tables 2 and 3.

<Total Light Transmittance and Haze>

With respect to the obtained decorative sheet, the total light transmittance (%) and the haze (%) thereof were measured using a haze meter (HAZE-GAAD II, manufactured by Toyo Seiki Seisaku-sho, Ltd.).

The measured total light transmittance and haze were evaluated based on the following criteria.

In a case where the total light transmittance is equal to or more than 60%, it is determined that the light transmission is good, and in a case where the total light transmittance is less than 60%, it is determined that the light transmission is poor and a frosted glass-like effect cannot be obtained.

In a case where the haze exceeds 95%, it is determined that the visibility is low due to opacity and a frosted glass-like effect cannot be obtained; in a case where the haze is equal to or less than 95% and equal to or more than 45%, it is determined that a moderate frosted glass-like effect can be obtained; in a case where the haze is less than 45% and equal to or more than 35%, it is determined that a frosted glass-like effect can be obtained at a level where there is no practical problem; and in a case where the haze is less than 35%, it is determined that a light diffusion (blurring) effect is low due to transparency and a frosted glass-like effect cannot be obtained.

<Visual Evaluation>

Each of the decorative sheets obtained in Examples 1 to 21 and Comparative Examples 12 to 15 was placed on a surface of a printed matter on which black characters of 10 mm×10 mm were printed, at a distance of 50 mm from the surface.

In a case of being observed through the decorative sheets obtained in Examples 1 to 18, the characters were appropriately blurred to the extent that the characters could not be discriminated, and therefore a frosted glass-like effect was obtained; whereas in a case of being observed through the decorative sheets obtained in Comparative Examples 12 to 15, the characters could be discriminated and therefore a frosted glass-like effect could not be obtained.

The decorative sheet obtained by the same inkjet printing operation as in Example 10 using a white ink for inkjet (trade name: TIC-JET1002R-ST W, titanium dioxide content: 15% by weight, average particle size: 200 nm, manufactured by Tokyo Printing Ink Mfg. Co., Ltd.) including no monofunctional monomer had a total light transmittance of 43% and a haze of 95%, and was white and opaque in the <Visual evaluation>, which could not be said to be frosted glass-like at all.

<Evaluation of Banding>

The obtained decorative sheet was visually observed for the presence or absence of banding. The case in which banding did not occur was marked with A, and the case in which banding occurred was marked with C.

Examples 22 to 24

The same inkjet printing operation as in Example 20 was repeated twice, three times, and four times to obtain decorative sheets of Examples 22 to 24. The above evaluation items were evaluated for the obtained decorative sheets. The obtained decorative sheets of Examples 22 to 24 had total light transmittances of 89%, 88%, and 88%, respectively, a haze of 76%, and a banding of being marked with A.

Comparative Example 16

In addition, Comparative Example 16 was carried out in the same manner as in Example 1 of Table 2, except that the "time until irradiation" was changed to "10 s". In Comparative Example 16, it was found that the productivity was lowered and therefore there was a problem in practical use.

Comparative Example 17

In addition, Comparative Example 17 was carried out in the same manner as in Example 1 of Table 2, except that the "liquid droplet density by one main scan" was changed to "0.01 µl/in$^2$". In Comparative Example 17, it was found that the productivity was lowered and therefore there was a problem in practical use.

It was found that, by producing the decorative sheets of Examples 1 to 24, a good frosted glass-like printed matter (plurality of dots) could be formed on a transparent base material.

In addition, it was found that, in the production of the decorative sheets of Examples 1 to 21, the occurrence of banding can be suppressed as compared with Comparative Examples 1 to 11; a glass-like decorative sheet having an excellent aesthetic appearance could be realized as compared with Comparative Examples 2, 5, and 12 to 15; and the productivity could be improved as compared with Comparative Examples 16 and 17.

This application claims priority on the basis of Japanese Patent Application No. 2018-239033 filed on Dec. 21, 2018, the disclosure of which is herein incorporated by reference in its entirety.

The invention claimed is:

1. A decorative sheet manufacturing method for manufacturing a decorative sheet,
   using an inkjet printer including a head unit provided with a plurality of nozzles for jetting liquid droplets of an ultraviolet curable ink and
   an ultraviolet irradiation unit that moves together with the head unit in a main scanning direction of the head unit and irradiates the liquid droplets jetted from the nozzles and landed on a main surface of a transparent base material with ultraviolet rays,
   the decorative sheet having the transparent base material and a plurality of dots formed in a print region on the main surface of the transparent base material and formed of a cured product of the ultraviolet curable ink, and
   the decorative sheet manufacturing method comprising a printing step of forming the plurality of dots on the main surface of the transparent base material by carrying out inkjet printing satisfying the following printing conditions (1) to (3) in a multi-pass manner using the inkjet printer,
   wherein the ultraviolet curable ink has a surface tension of equal to or less than 25 mN/m measured at 25° C.,
   printing conditions:
   (1) an amount of the liquid droplets jetted from the nozzles is equal to or more than 1 pl and equal to or less than 50 pl,
   (2) a waiting time from when the liquid droplets jetted from the nozzles land on the main surface to when the liquid droplets are irradiated with ultraviolet rays from the ultraviolet irradiation unit is equal to or longer than 10 ms and equal to or shorter than 5.0 s, and
   (3) when a liquid droplet density in the print region in a case where the head unit is main-scanned once in the main scanning direction is defined as "the amount of the liquid droplets in the (1)×output resolution in main scanning direction×output resolution in sub-scanning direction/number of passes of the inkjet printer", the liquid droplet density is equal to or more than 0.1 µl/in$^2$ and equal to or less than 1.0 µl/in$^2$.

2. The decorative sheet manufacturing method according to claim 1, wherein the number of passes is equal to or more than 4 in the printing step.

3. The decorative sheet manufacturing method according to claim 1, wherein an integrated light amount of ultraviolet rays emitted to the landed liquid droplets, in the printing step, is equal to or more than 10 mJ/cm$^2$.

4. The decorative sheet manufacturing method according to claim 1, wherein the transparent base material is made of a light-transmitting resin film.

5. The decorative sheet manufacturing method according to claim 1, wherein at least a part of liquid droplets after a second pass is landed on a cured product of the liquid droplets in the printing step.

6. The decorative sheet manufacturing method according to claim 1, wherein, in the printing step, a leveling layer formed of the cured product of the ultraviolet curable ink is formed on the main surface of the transparent base material and the plurality of dots are formed on the leveling layer.

7. The decorative sheet manufacturing method according to claim 1,
   wherein the ultraviolet curable ink includes
   a polymerizable monomer and
   a surface conditioner, and
   the ultraviolet curable ink has a surface tension of equal to or less than 25 mN/m measured at 25° C.

8. The decorative sheet manufacturing method according to claim 7, wherein the polymerizable monomer includes a polyfunctional monomer.

9. The decorative sheet manufacturing method according to claim 7, wherein the polymerizable monomer does not include a monofunctional monomer.

10. The decorative sheet manufacturing method according to claim 1, wherein the ultraviolet curable ink includes titanium dioxide as an ultraviolet absorber, and a content of the titanium dioxide is equal to or less than 10% by weight with respect to 100% by weight of the ultraviolet curable ink.

11. The decorative sheet manufacturing method according to claim 10, wherein the titanium dioxide in the ultraviolet curable ink has an average particle size of equal to or more than 5 nm and equal to or less than 200 nm.

12. The decorative sheet manufacturing method according to claim 1, wherein the ultraviolet curable ink has a viscosity at 25° C. of equal to or more than 20 mP·s and equal to or less than 50 mP·s, as measured using a cone-plate type viscosity meter.

13. The decorative sheet manufacturing method according to claim 1, wherein the ultraviolet curable ink includes a photopolymerization initiator.

14. The decorative sheet manufacturing method according to claim 13, wherein the photopolymerization initiator includes a photopolymerization initiator having a 2-hydroxy-2-methylpropionylphenyl skeleton.

15. The decorative sheet manufacturing method according to claim 1, wherein the ultraviolet curable ink includes an antioxidant.

16. The decorative sheet manufacturing method according to claim 1, wherein the ultraviolet curable ink is a non-water-based ultraviolet curable ink that does not include water.

17. The decorative sheet manufacturing method according to claim 1, wherein the ultraviolet curable ink is a non-organic solvent-based ultraviolet curable ink that does not include a non-reactive organic solvent.

\* \* \* \* \*